United States Patent [11] 3,596,046

[72] Inventors Jacques Jean Lucien Valleins
 Paris;
 Bernard Max Eugene Begue, Pavillon-sous-Bois, both of, France
[21] Appl. No. 793,091
[22] Filed Jan. 22, 1969
[45] Patented July 27, 1971
[73] Assignee Vallourec Usines a Tubes de Lorraine-Escaut et Vallourec Reunies
 Paris, France
[32] Priority Jan. 23, 1968
[33] Luxembourg
[31] 55,333

[54] MANUFACTURE OF STEEL TUBES FROM STEEL STRIP BY ELECTRON BOMBARDMENT
 9 Claims, 4 Drawing Figs.
[52] U.S. Cl. .................................................. 219/121LB
[51] Int. Cl. ........................................................ B23k 15/00
[50] Field of Search ............................................. 219/121, 60, 59, 61, 121, 121 EB

[56] References Cited
UNITED STATES PATENTS

| | | | |
|---|---|---|---|
| 2,788,430 | 4/1957 | Oakley | 219/60 |
| 3,169,182 | 2/1965 | Oakley | 219/60 |
| 3,440,390 | 4/1969 | McCullough | 219/121 |
| 2,496,188 | 1/1950 | Wiese | 219/61 |
| 3,028,469 | 4/1962 | Bognar | 219/8.5 |
| 3,426,173 | 2/1969 | Steigerwald | 219/121 |

Primary Examiner—J. V. Truhe
Assistant Examiner—Robert O'Neill
Attorney—Breitenfeld & Levine ABSTRACT: The invention relates to a process for the manufacture of steel tubes from steel strip by electron bombardment in vacuo. Vacuum is applied to one end of a tube, the other end being open. The welding operation taking place at the end adjacent the application of vacuum. A sleeve is provided inside the tube to ensure a sufficient degree of vacuum at the welding position.

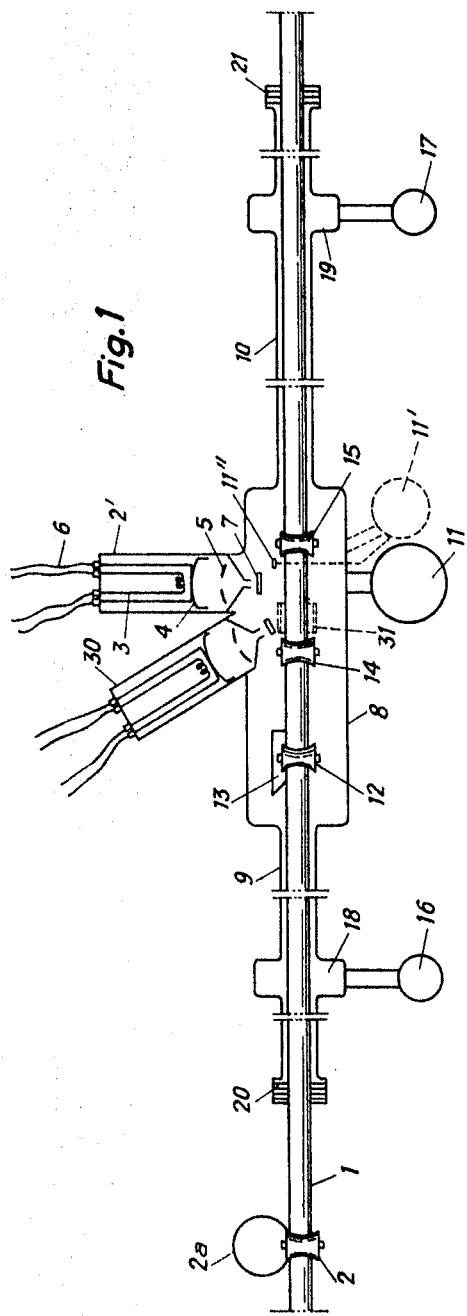
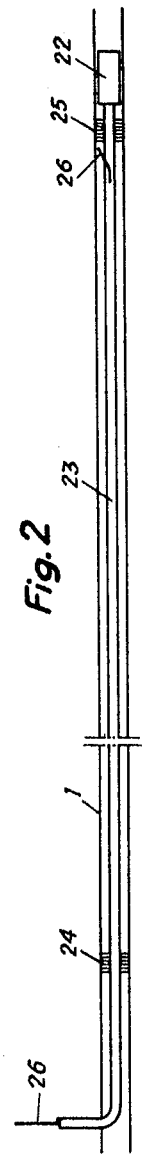
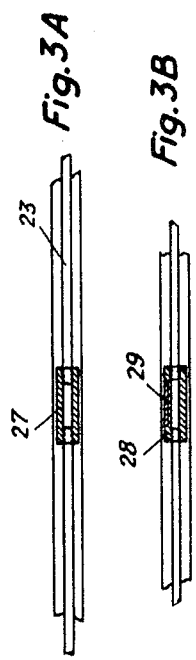
INVENTORS:
JACQUES J. L. VALLEINS
BERNARD M. E. BEGUE

MANUFACTURE OF STEEL TUBES FROM STEEL STRIP BY ELECTRON BOMBARDMENT

This invention relates to the manufacture of tubes from welded steel, special steels or stainless steels in particular.

In a conventional type of installation, a roll of strip metal is as a rule continuously unwound, and the strip passes through a forming station which converts it into tube form, then through a welding station for welding the edges together and, finally, through a calibrating roller preceding a cutting unit which cuts the tube into predetermined lengths.

Hitherto, welding has mainly been carried out by arc welding in an inert atmosphere or ionizing atmosphere. In spite of the advantages of this particular technique, it has the disadvantage *inter alia* of restricting the rate of production or output.

The present invention relates to a means for welding the edges of the strip metal together, by virtue of which it is possible to reach outputs considerably increased in relation to what has hitherto been possible, to obtain welds of outstanding quality even with metals that are difficult to weld or for the manufacture of multiple-wall tubes with different metals, to weld tubes of greater thickness and at the same time to obtain products of the same quality as the tubes welded in the absence of a supporting metal, and in certain cases, in particular for small tubes, to avoid the operation of scraping or flattening the weld bead.

According to the invention, the technique of welding in a vacuum by electron bombardment is applied to the continuous manufacture of metal tubes. This technique employs an electron gun which emits electrons capable of producing a weld providing the electron beam does not pass through a zone in which an excessively high pressure prevails. For example, the vacuum between the gun and the working plane is generally kept between $10^{11}$ and $10^{12}$ torr, a pressure in respect of which there is never any need to use VHT (very high tension) and which accordingly does not call for elaborate protection against X-rays.

Accordingly, it has hitherto only been possible to apply the technique of welding by electron bombardment to sections of limited length capable of being accommodated in an enclosure in which an adequate vacuum is generated.

Before the technique of vacuum welding by electron bombardment could be applied to continuously delivered tubes, certain problems associated with the very nature of these products had to be solved.

First of all, applicants used to good effect a particular phenomenon for taking into account that the sections to be welded are of almost infinite length. It was found that if one of the ends of a tube is connected to a vacuum pump, its other end being open to the atmosphere, a satisfactory vacuum can be set up in the vicinity of that end connected to the pump providing the tube is long enough, there is no need to provide a perfect seal at the open end of the tube.

However, in view of the very form of the tube, a perfect seal has to be provided not only outside but also inside the tube. This is possible providing the edges of the strip of metal are prized apart before entering the welding station so as to accommodate inside the tube, in particular below the welding station, means which provide for a certain degree of tightness, on the lines of a seal, during the welding operation.

In addition, the very form of the tube prompted applicants to provide a refractory composition inside the tube where it is welded in order to protect both the means which provide for a certain level of tightness inside the tube, and also the lower surface of the tube against the electron beam.

Accordingly, a station for welding a continuously delivered metal tube *in vacuo* by electron bombardment in accordance with the invention comprises an electron gun connected to a fluidtight housing capable of accommodating the sets of rollers required for guiding and welding the tube, being extended at each end by sleeves long enough for the vacuum obtained by at least one main pump connected in the vicinity of the welding zone to be sufficient to permit welding, taking into account the additional sealing means optionally provided at the free ends of the sleeves and/or partial vacuums generated in the sleeves, sealing means being provided inside the tube above and below the welding station, and means being provided inside the tube to protect at least the lower surface of the tube against the effect of the electron beams emitted by the aforementioned electron gun.

It may be of advantage to provide means completing the pumping action of the vacuum pump connected to the housing along the sleeves and in particular near the ends. These means may comprise on the one hand mechanical, hydraulic or pneumatic sealing means in contact with the tube passing through the welding station, and on the other hand a slight vacuum generated for example by vane pumps connected to the space between the moving tube and the sleeves.

The internal sealing means may comprise mechanical sealing means such as cylinders in a plastics material with a low coefficient of friction, such as polytetraufluoroethylene. If a tool is provided for scraping or flattening the weld bead inside the tube, these sealing means are with advantage carried by the rod used to support the aforementioned tool.

In this case, it is advisable to provide rollers by which the tube is suitably opened just before entering the welding station, and rollers with means placing the edges in a correct position relative to the electron beam, and finally rollers which reclose the tube just before welding and rollers holding the edges tightly against one another after welding. In this way, the sealing means may be supported inside the tube by a support extending between the edges of the strip of metal prized apart before entry into the welding station.

The means which protect the lower surface of the tube at least preferably consist of a piece of molybdenum, for example in the form of a bar. Where a rod or similar support is arranged inside the tube, this rod also has to be protected against the electron beam. To this end, part of the rod is with advantage made of a refractory material such as molybdenum, or alternatively the rod is made with a nacelle to accommodate the bar of molybdenum or similar material.

According to another aspect of the invention, the tube is preferably preheated near the welding zone, as known per se for tubes of ordinary steel and also for tubes of stainless steel welded in an inert or ionizing atmosphere.

Various methods of preheating are possible. In a first method, the electron beam supplied by the gun to make the weld is deformed in such a way that deformation of the spot ensures preheating of the edges. An additional gun may also be arranged above or upstream of the main gun. Finally, preheating may be carried out by medium frequency or radiofrequency induction.

Other features which also form part of the invention will be apparent from the following description in conjunction with the accompanying drawings given primarily by way of example in which:

FIG. 1 is a diagrammatic section through part of the production line on which a welded tube according to the invention is made, FIG 2 diagrammatically illustrates the inside of a tube during production, and FIGS. 3A and 3B show modified embodiments of the means which protect the inner surface of the tube.

In FIG. 1, the reference 1 denotes a strip of metal, delivered continuously, which has already been converted by preceding stations (not shown) into a tube of circular cross section. A set of rollers 2 combined with a fixed or displaceable blade 2a ensures that the tube is suitably opened as it enters the welding station so that the means capable of generating the required vacuum inside the tube can be introduced into it.

The welding station comprises an electron gun generally denoted by the reference 2' which consists of a filament 3, a cathode 4, and anode 5 with feed cables 6 for the filament and the cathode. Placed in the axis of the gun is a concentrating coil 7 connected to a suitable voltage source.

The electron gun, in which the requisite vacuum is generated by means of a pump (not shown) is connected to a tubular housing 8 designed to accommodate a set of suitable rollers, being extended at either end by sleeves 9 and 10, respectively, of appreciable length, i.e. some meters. A vacuum pump 11 is connected to the housing 8 in the vicinity of the welding zone.

The rollers accommodated in the housing 8 may comprise a first set 12 cooperating with a blade 13 for placing the edges of the strip in a correct position relative to the beam of electrons emitted by the gun 2'. The first set of rollers is followed by a second set 14 by which the tube is closed just before welding, and by a set of pressure rollers 15 holding the edges tightly against one another just after welding.

In the vicinity of the free ends of the sleeves, a gentle vacuum is preferably created between the sleeve and the tube by means of a pump such as a vane pump 16, 17 sucking into annular chambers 18 and 19, respectively, provided for this purpose. In addition, mechanical means, hydraulic means or pneumatic means 20 and 21 in contact with the tube seal off the ends of the sleeves.

In certain cases, it is of advantage to provide inside the tube a tool 22 which is normally used to scrape or flatten the weld bead. This tool is carried by a bar or tubular element 23 which simultaneously acts as a support for the internal sealing means 24 and 25.

If a tool of this kind is not absolutely essential, a corresponding support may be provided.

These sealing means are arranged in contact with the inner surface of the tube to complete the sealing action of the outer means 20 and 21.

The internal sealing means 24 arranged substantially opposite the external means 20 may with advantage consist of a cylinder in a plastics material, for example polytetrafluoroethylene, with a longitudinal groove on the outside positioned on the upper part of the tube in such a way that it partially obscures the opening provided by the blade 2a.

The sealing means 25 which may be of considerable length may optionally be improved in terms of efficiency by allowing a liquid of extremely low vapor pressure to flow at a regular rate of flow on to the top downstream end of these means through a small tube 26 incorporated in the rod 23 or in the supporting rod or tube, in such a way that the liquid impregnates the entire inner surface of the tube.

It may also be of advantage to provide an additional pump maintaining a partial vacuum inside the tube. This vacuum may be created through the rod 23 acting as a support for the internal sealing means and the tool, if any, used to scrape the weld bead.

It is advisable to provide a composition protecting both the lower surface of the tube and the rod or tubular element 23 in the path followed by the electron beam beneath the upper surface of the tube. This composition is a refractory composition, preferably molybdenum. It may be in the form of a bar 27 forming part of the rod 23 (FIG. 3A). It is also possible to provide on the rod or tubular element 23 a nacelle 28 in the thickness of which the molybdenum bar 29 is accommodated (FIG. 3B).

It may be of advantage to cool the protective composition by circulating water.

The tube is preferably preheated near the welding zone as known per se for welding ordinary steel tubes and also for welding stainless steel tubes in an inert or ionizing atmosphere. In the example shown, preheating is effected by an additional electron gun 30 inclined relative to the axis of the main gun 2'. It is also possible to use for this purpose medium frequency or radiofrequency induction coils 31 located before the gun 2' or in front of the blade 13. A screen 32 is preferably provided to protect the electronic lenses against the effects of RF.

Naturally, the production line for tubes welded in accordance with the invention has to be modified in relation to a conventional production line, not only by replacing the conventional welding station by an electron bombardment welding station, but also by increasing the distance separating the welding station from the forming station and the calibrating station, respectively, so as to allow positioning of the long sleeves connected to the housing of the welding station. In addition, the strip metal used should be clean and dry and in particular free from oil to avoid any evaporation in the welding zone.

It is obvious that the embodiment described has been given above all by way of example and that it may be modified in several ways without departing from the scope of the invention.

Thus, other pumps such as 16 and 17 may be provided in the vicinity of the housing 8, whilst two pumps such as 11 may be provided on either side of the axis of the electron gun 2'. Similarly, it may be of advantage to provide chican in the sleeves 9, 10 in order to form kinds of compartments to each of which a pump is connected. Finally, to provide a seal at 20, i.e. below the welding station, an annular pump may be arranged in such a way as to blow a liquid screen substantially tangentially on to the tube in the direction in which it travels.

In addition, the pump 11 may be associated with an auxiliary regulating pump 11' controlled from a pressostat 11 measuring the vacuum in the vicinity of the welding zone. This pump 11' completes the action of the main pump 11 so that the vacuum in the welding zone is constant whatever the fluctuations in pressure attributable to production.

We claim:

1. A welding station for welding together the butting longitudinal edges of a strip formed into a tube which moves continuously through the station, comprising a housing having two spaced-apart ends, means for creating a partial vacuum within said housing, an electron gun connected to said housing for providing a beam capable of welding the tube material, means within said housing for pressing the longitudinal edges of the tube together immediately before and after they are welded, a relatively long sleeve extending from each end of said housing, the interior of each sleeve communicating with the interior of said housing, means for moving the tube longitudinally so that the tube enters said housing by passing through one sleeve and leaves said housing by passing through the other sleeve, means near the end of each sleeve remote from said housing for aiding the maintenance of a partial vacuum in said housing, said means near the end of each sleeve cooperating with the length of its respective sleeve to maintain the desired partial vacuum in said housing, spaced-apart sealing means inside the tube, one of said sealing means engaging the tube before it enters said housing and another of said sealing means engaging the tube after it leaves said housing, and protective means inside the tube in the region of said gun for protecting the portion of the tube opposite the edges being welded from the effects of the beam provided by said gun.

2. A welding station as defined in claim 1 wherein said means near the end of each sleeve includes a seal engaging the interior of the sleeve and the exterior of the tube.

3. A welding station as defined in claim 1 wherein said means near the end of each sleeve includes means for creating a partial vacuum in the space between the sleeve and the tube.

4. A welding station as defined in claim 1 wherein said sealing means inside the tube each includes a plastic cylindrical element having a low coefficient of friction.

5. A welding station as defined in claim 1 including an elongated member extending along the length of and inside the tube, a tool carried by said member for scraping the weld bead from said tube, said member also carrying said sealing means inside the tube.

6. A welding station as defined in claim 1 wherein said protective means includes a molybdenum bar.

7. A welding station as defined in claim 1 including an elongated member extending along the length of and inside the tube, a tool carried by said member for scraping the weld bead from said tube, said member also carrying said protective means.

8. A welding station as defined in claim 1 in combination with means in advance of the welding station for separating the longitudinal edges of the tube to open the latter, means in advance of said gun for positioning the longitudinal edges of the tube with respect to the beam from said gun, and means between said positioning means and said gun for closing the tube immediately prior to welding.

9. A welding station as defined in claim 8 including an elongated member extending along the length of and inside the tube, said member entering the tube through the opening provided by said edge separating means, a tool carried by said member for scraping the weld bead from said tube, said member also carrying said sealing means inside the tube and said protective means.